United States Patent [19]
Light

[11] 3,739,839

[45] June 19, 1973

[54] SYSTEM FOR PREVENTING SCALE FORMATION WHEN HEATING FLUIDS CONTAINING SCALE-FORMING INGREDIENTS

[76] Inventor: George S. Light, Post Office Box 496, Winsted, Conn. 06098

[22] Filed: Nov. 24, 1970

[21] Appl. No.: 92,436

Related U.S. Application Data

[63] Continuation-in-part of Ser. No. 735,790, June 10, 1968, Pat. No. 3,565,767, which is a continuation-in-part of Ser. No. 439,047, March 11, 1965, abandoned.

[52] U.S. Cl. .................................... 165/1, 165/11
[51] Int. Cl. ........................................... F25b 13/00
[58] Field of Search .................... 165/1, 11; 203/11

[56] References Cited
UNITED STATES PATENTS
3,246,505  4/1966  Koehmstedt et al ................... 165/70

*Primary Examiner*—Charles Sukalo
*Attorney*—Prutzman, Hayes, Kalb & Chilton

[57] ABSTRACT

A system for heating a supply solution containing scale-forming ingredients without depositing encrusted scale on the heating surface thereof includes a heating chamber, a separate pressurizing chamber and an unobstructed conduit connecting the chambers for solution flow therethrough. An air space in the pressurizing chamber is provided for applying a positive air pressure to the solution in the pressurizing chamber and a back pressure in the solution for suppressing vapor bubble formation at the heating surface.

5 Claims, 1 Drawing Figure

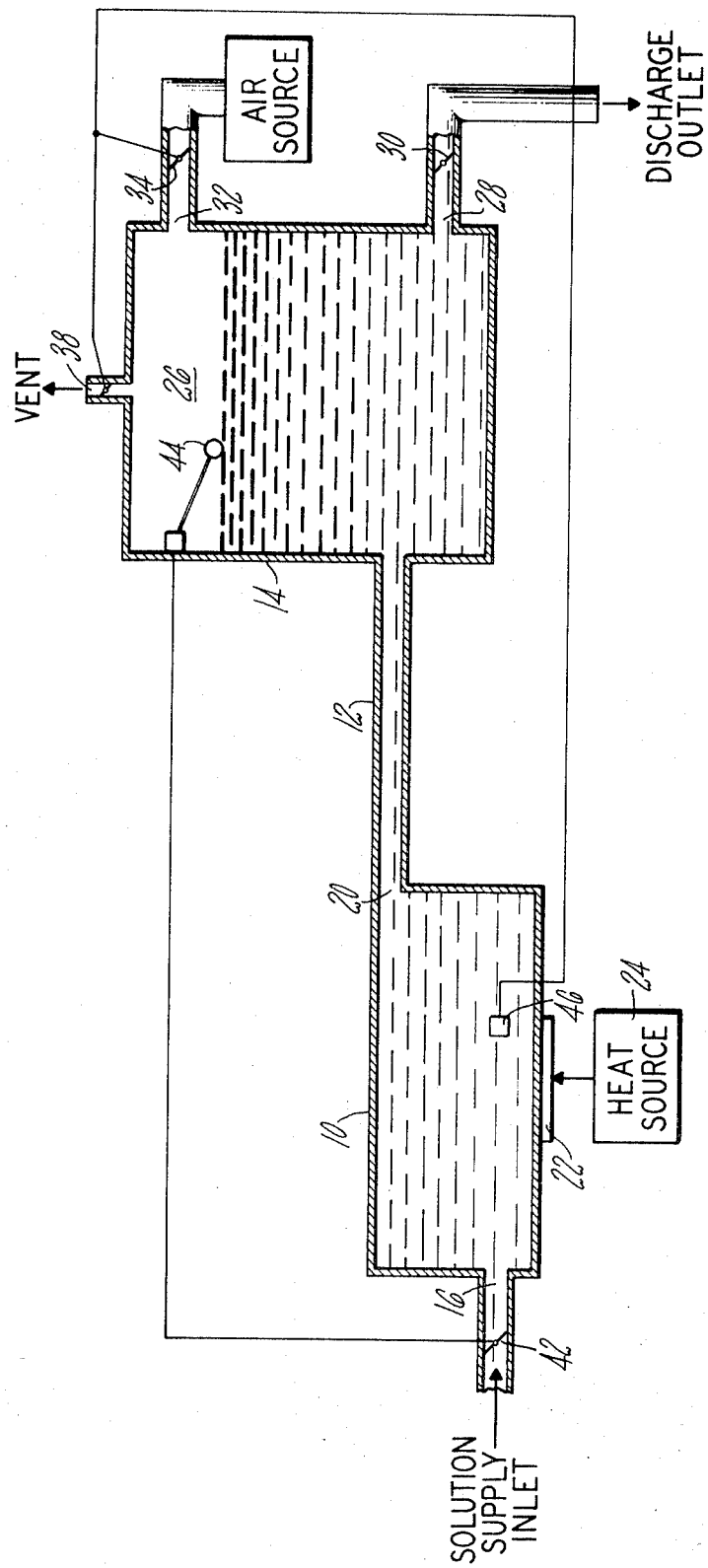

SYSTEM FOR PREVENTING SCALE FORMATION WHEN HEATING FLUIDS CONTAINING SCALE-FORMING INGREDIENTS

This application is a continuation-in-part of my copending U.S. Pat. application Ser. No. 735,790 filed June 10, 1968, now U.S. Pat. No. 3,565,767 granted Feb. 23, 1971, which in turn is a continuation-in-part of my earlier U.S. Pat. application Ser. No. 439,047 filed Mar. 11, 1965, now abandoned.

BACKGROUND

The need for converting brackish water or sea water into consumable fresh water has long been recognized. However, it is known that a hardened encrustation of scale is deposited on the heating surfaces in contact with the aqueous solution being treated when such water is heated to effect demineralization and desalinization thereof. It is believed that this encrustation results from the baking of salts deposited during the formation of minute vapor bubbles at the heating surfaces. The vapor bubbles are generated at the heating surfaces and slowly enlarge until they are of sufficient size to break away and rise to the top of the solution. When this process becomes rapid, the water is said to "boil." It will be appreciated that as the vapor bubbles form on the heating surfaces they define small isolated areas that are no longer in contact with liquid, that is, they form "dry spots" where only water vapor contacts the heating surfaces. Since the scale-forming ingredients in the solution are not as volatile as the liquid, they tend to deposit on the heating surfaces within the dry spots and bake in place. This causes hardening and adherence of the scale to the heating surfaces and reduces the efficiency thereof.

Many techniques have been employed to prevent scale formation on the heating surfaces, including chemical treatments. However, since the use of temperatures near or above the normal boiling point of the solution tend to offer greater economies, techniques such as flash evaporation that can use such temperatures, yet avoid boiling, have been extensively explored. Flash evaporation attempts to avoid the scale formation problem by heating the saline solution in a first chamber under pressure to suppress vapor formation and subsequently releasing the pressurized liquid into a chamber of lower pressure or partial vacuum to cause flashing of the liquid within an area remote from the heating surfaces. Unfortunately, these systems generally develop pressures of varying degrees by means of a hydraulic flow directed downstream along the heating surfaces to the evaporating chamber for evaporation. Such an arrangement frequently loses its effectiveness due to obstructions, velocity changes, erratic flow rates and negative outlet pressures. As a result, even high hydraulic inlet pressures do not maintain the necessary pressurized conditions to satisfactorily prevent scale formation on the heating surfaces.

In my copending U.S. Pat. application Ser. No. 735,790 filed June 10, 1968, now U.S. Pat. No. 3,565,767 granted Feb. 23, 1971, there is described a new and improved technique for remedying the scale formation problem. In accordance with that technique a pneumatic pressure is applied directly to the evaporating surface of the heated solution to suppress vapor bubble formation at the heating surface coupled with simultaneous withdrawal of the vapor from the pressurizing chamber.

SUMMARY OF THE INVENTION

The present invention relates generally to a new and improved pneumatic pressure system for preventing scale formation when heating fluids containing scale-forming ingredients. More particularly, it relates to a new and improved method and apparatus having particular utility in the demineralization of saline waters and the recovery of usable water therefrom.

It is an object of the present invention to provide a new and improved system for avoiding scale formation during the heating of solutions containing scale-forming ingredients. Included in this object is a system for suppressing the undesirable formation of vapor bubbles or boiling within the body of a solution and particularly at the heating surfaces contacted by the solution when said solution is heated, this effect being achieved by the utilization of a positive air pressure downstream from the heating surface in contact with the solution.

Another object of the present invention is to provide a new and improved method and apparatus of wide practical utility which is particularly well suited for producing fresh water from solutions containing scale-forming materials while obviating the deposition of hard scale on the heating surfaces used to heat the solution and the resultant loss in heating efficiency.

A further object of the present invention is to provide a method and apparatus of the type described that utilizes a positive pneumatic back pressure acting on the solution in contact with the heating surface to control undesirable scale formation within a heater remote from and upstream of the chamber wherein the pressure is applied.

A still further object of the present invention is to provide a new and improved method and apparatus for heating solutions containing potential scale-forming ingredients by maintaining continuous wet contact with the entire solid heating surface thereby preventing the formation of dry spots believed responsible for encrustation of scale thereon.

Still another object of the present invention is to provide a new and improved system utilizing pneumatic back pressure directed toward the heating surface to render the system independent of those variables previously found disadvantageous in flash evaporation techniques.

Other objects will be in part obvious and in part pointed out in more detail hereinafter.

These and related objects are effectuated in accordance with the present invention by providing a system incorporating a heating chamber having a solution supply inlet and a solid heating surface in contact with the solution, a separate pressurizing chamber, and an unobstructed conduit connecting the chambers. A supply solution containing scale-forming ingredients is fed to the heating chamber and pressurizing chamber in sufficient volume to provide an air space in the pressurizing chamber. A quantity of pressurized air is pumped into the pressurizing chamber to produce a positive back pressure acting on the liquid in the heating chamber. Thereafter the liquid may be heated without causing boiling or internal vapor formation at the heating surface of the heating chamber. The heated liquid is removed from the pressurizing chamber for subsequent use while maintaining the pressure therein. Since the heated liquid is not in contact with the heater during the subsequent use thereof, encrustation by the scale-forming contaminants is avoided.

The invention accordingly comprises the several steps and the relation of one or more of such steps with respect to each of the others and the features of construction, combination of elements and arrangement of parts which will be exemplified in the construction hereafter set forth.

BRIEF DESCRIPTION OF THE DRAWING

In the drawing:

The sole FIG. is a schematic illustration of a heating and pressurizing apparatus incorporating the system of the present invention.

DESCRIPTION OF A PREFERRED EMBODIMENT

In its broader aspects the system of the present invention negates boiling or the formation of vapor bubbles within the supply solution where it contacts the heating surface, and thereby minimizes the deposition of substantial amounts of scale-forming constituents contained in the supply solution by means of pressurized air applied to at least a part of the supply solution downstream from the heating surface to pressurize the solution to a state of compressed liquid where the solution contacts the heating surface. However, for ease of illustration and clarity of understanding, the system of the present invention will be described hereinafter in connection with the desalinization of sea water. Of course, it will be appreciated that other uses of the system are contemplated including the use of other liquids such as brackish or hard waters or other liquid materials.

Referring now to the drawing in greater detail, the system of the present invention is shown as embodied within a device consisting essentially of a supply solution heating chamber 10 connected by a passage or conduit 12 to a downstream pressurizing chamber 14 so that the solution to be treated passes smoothly and sequentially through the respective chambers prior to delivery to a device such as a flash evaporator. As will be readily appreciated from the illustrated embodiment, the supply solution containing the scale-forming ingredients is delivered to the enclosed heating chamber 10 through a supply solution inlet port 16 located at the end of the chamber 10 opposite the conduit 12. The closed heating chamber, preferably constructed of corrosion resistant material such as stainless steel, includes not only the solution inlet port 16 on one end and a solution outlet port 20 on the opposite end connected to the conduit 12 but also a solid heating surface 22 shown as being located at the lower central part of the chamber. The heating surface 22 is connected to and regulated by a suitable heat supply source 24. The heating surface 22 found useful in the present invention is the coil or heat conducting surface of a heat exchanger and may be generally considered as a solid heat conducting member in contact with the solution being treated. Of course other similar devices may be employed.

After filling the heating chamber 10, the supply solution flows through the unobstructed and free conduit 12 and passes into the remotely located pressurizing chamber 14, partially filling the latter until it acquires a certain desired level to form a pressurizing space 26 above the solution. The pressurizing chamber 14 is an enclosed container having a solution discharge or outlet port 28 for delivering the pressurized and heated solution to its point of use, such as to a flash evaporating compartment (not shown). Flow of the solution through the outlet port 28 may, of course, be controlled by a valve 30 that also assists in maintaining the controlled pressurized condition within the chamber 14. Additionally, the chamber 14 includes an air inlet port 32 controlled by throttle valve 34, the port 34 being located adjacent the top of chamber 14 in direct communication with pressurizing space 26.

The liquid within the pressurizing chamber 14 is pressurized by delivering air through an air inlet port 32 from a suitable air source (not shown) having the ability to effect a positive static pressure component on the top surface of the liquid. The static air pressure is regulated to maintain an appropriate solution pressure greater than the saturation pressure of the solution at the temperature of the solution where it is in contact with the heating surfaces, whereby the solution is generally considered a compressed liquid and whereby no vapor bubbles or boiling occurs within the solution. As will be appreciated, the static air pressure in contact with the solution transmits pressure reasonably uniformly throughout the solution and particularly applies an upstream pressure component through the conduit 12 and on the solution within the heating chamber 10. Unlike the pressurizing chamber described in my earlier U.S. Pat. application Ser. No. 735,790, the system of the present invention need not include a vapor-extracting outlet or port for collecting vapor from the pressurizing space above the liquid, although a pressure release valve 38 may be provided, as will be discussed in greater detail hereinafter.

A supply solution control valve 42 is provided between the source of saline solution and the heating chamber to control flow of the saline solution to the inlet port of the heating chamber. In accordance with the present invention the valve 42 is controlled by a float 44 or other fluid level detecting means positioned within the pressurizing chamber so as to permit controlled continuous or intermittent flow of the solution into and through the system. In this way the desired fluid level is maintained within the pressurizing chamber and at the same time control is maintained over slight variations occurring as a result of fluctuation in the level of the liquid within the pressurizing chamber. As mentioned, the pressurizing chamber is provided with a suitable solution discharge outlet 28 having a control valve 30 therein for controlling the outward flow of the heated pressurized solution and maintaining the appropriate total volume of liquid within the chamber 14 for assisting in maintaining the desired press.r-ized conditions.

An important feature of this invention resides in the application and control of the pressurized air which is caused to contact the top surface of the supply solution within the pressurizing chamber. It has been found that only moderate quantities of air need be admitted to the pressurizing space, with the quantity of air admitted being dependent on the quantity of air required to achieve the proper pressurizing of the supply solution in order that it be in the state of a compressed liquid where it contacts the heating surface. The amount of air admitted from time to time, therefore, is that amount required to build and maintain the static pressure at the desired level and to maintain the static pressure in the event of air loss or leakage from the system or in the event of variation in the level of the solution.

The air supplied to the pressurizing space 26 is generated by a conventional air pump or compressor capable or regulation by means of known speed or throttle control regulators to control pressures or pressure making quantities, as required. It will be understood that in most instances the pressurized air for pressurizing the supply solution will not flow or move through the pressurizing space and will, in effect, be stationary while applying the desired static pressure force to the supply solution. In other instances, where air loss or leakage from the pressurizing space occurs or fluctuations in the solution level occur, the desired static air pressure is maintained by increasing the amount of the air pressing on the supply solution so that the desired degree of pressure is maintained at the heating surface. When the static pressure volume must be renewed or increased, air is caused to flow into the pressurizing space 26 by means of the impact pressure force component of the air supplied by the controllable air supply pump. On the other hand, the vent 38 is provided to reduce the volume of air should the level of the solution rise.

The air supply pump or system of this invention is the means whereby the static pressure is developed and maintained on the surface of the solution, so that the solution pressure where it is in contact with the heating surface, is greater than the saturation pressure of the solution at the temperature of the solution at the heating surfaces. The air supplied to the pressurizing space in pressing on the surface of the supply solution establishes the compressed liquid condition of the supply solution at the heating surface thereby serving to prevent boiling or the formation of vapor bubbles in the solution at the heating surface.

The air caused to move into the pressurizing space by the air supply pump possesses an impact force component serving to propel the air into the space. This moving air also possesses, as is well known, a static force component. The impact force component serves to overcome the resistance of the air to flow and causes the air to enter the space and the static force component serves as the pressurizing force on the surface of the supply solution. The air pressure system utilized with this invention, being capable of imparting an impact force component, can readily maintain the static force component on the surface of the supply solution by movement of the required amount of air into the pressurizing space. It will be understood by the workers skilled in the art that control of the air supply pump, and consequently of the air supplied to the pressurizing space, together with regulation of the gated fluid inlet 16 and discharge outlet 28 will assure proper control.

As illustrated, the system may be provided with a pressure-detecting unit 46 for sensing pressure changes adjacent the heating surface 22. The detecting unit is suitably connected to the valve 34 for controlling air flow through the air inlet port 32 into the pressurizing space 26. Thus, a slight excess discharge of solution from the outlet port 28 in the evaporating chamber or an obstruction in flow of the supply solution into the heating chamber will have an effect on the pressure at the heating surface and this effect will be detected by the unit 46. The appropriate amount of air can then be admitted to space 26 to maintain the proper pressurized condition. However, even though the pressure is maintained, the level of the liquid within the pressurizing chamber may fall until the float switch 44 controlling the valve 42 calls for increased flow at the supply inlet port 16. As the solution level rises, pressure will of course build up within space 26 and such increase is also detected by unit 46 and the condition corrected by automatic opening of vent 38 to bleed excess air from the pressurizing space 26. It will, of course, be appreciated that the pressure-detecting means can also be located elsewhere in the system such as in the space 26 since the pneumatic pressure applied to the top surface of the liquid within the pressurizing chamber will be transmitted throughout the entire solution to all portions thereof even though the liquid is located in a separate but connected compartment remote from the pressurizing air space.

In operating the saline supply solution is fed to the dual chambers prior to applying heat thereto. Air is then pumped into the pressurizing space 26 above the top surface of the solution within the pressurizing chamber to pressurize the system including the entire volume of fluid within both chambers thereby achieving the desired pressure conditions at the heating surface. Pressurizing with air over a relatively cool solution is accomplished by merely closing the valves 42 and 30 at the respective solution inlet and outlet ports, 16 and 28. The impact force component of the air developed by the controllable air supply pump will serve to propel air into the pressurizing space 26 to build up the pressure and establish the required static pressure on the solution. After charging and pressurizing the system, heat is applied through the heating surfaces in contact with the supply solution to raise the temperature of the solution until it reaches the desired operating temperature as indicated by appropriate temperature regulating or control means (not shown). Since the solution is in a compressed liquid state, the formation of vapor bubbles is entirely suppressed. Additionally, since the pressurizing chamber is located downstream from the heater and from the fluid supply inlet, pressure acting on the solution applies an upstream force component on the solution in the heating chamber to maintain the desired pressurized condition independently of the hydraulic pressure controlled by the supply solution feed control valve 42. As the water is drawn from the fluid discharge outlet 28, the variations in pressure and fluid levels are detected by the pressure control indicator 46 and/or by the float switch 44 to effect additional air and/or liquid flow. Once the system is operating, a quantity of air is always available from the regulatable air supply pump. This air is propelled by its impact pressure force component through the inlet 32 into the pressurizing space 26. The air in the space contacts at least a portion of the top surface of the solution and serves to build up and maintain the static pressure force components against the solution surface according to the requirements of the pressure and temperature sensed at the heating surfaces.

If air leakage or loss occurs, for example, through the air vent 38, the air supply pump is called upon to supply a quantity of water-unsaturated air and to continue to supply such air to produce the impact force and static pressure force components needed for correction. In the preferred operation the air loss will be at a minimum for there will be no passage of air through the pressurizing space. If little or no air is lost from the system and the volume of solution does not change, the static pressure will not decrease and the regulators for the air supply pump will not be required to cause additional air to be propelled into the space. Thus, it is expected that under normal and proper operation, quantities of air may be required at one moment and no air required at other times for the maintenance of the static pressure force component at the proper established level.

It has been observed that the temperature of the heating surface in contact with the liquid, such as the surface of the coils or walls of a heat exchanger, determines the desired pressure of the liquid at the heating surface and accordingly the appropriate static pressure component to be applied to the surface of the liquid within the pressurizing chamber. It will be appreciated that the pressure actually applied to the surface of the liquid must be greater than the pressure for saturated air at the temperature employed in order to avoid vapor of or bubble formation within the solution and particularly at the heating surface in contact with the solution. This relationship requires that the pressure must be greater than the saturation pressure for the temperature being used and the solution must be in the state of a compressed liquid. Accordingly, the density of the air pressing against the top surface of the liquid is at least 0.5 per cent greater than the density of air outside the system.

This invention, in a manner similar to my earlier U.S. Pat. application Ser. No. 735,790, advantageously utilizes the pressure-temperature relationships regarding boiling or vapor bubble formation of liquids, especially as regards water, and provides for the application of the appropriate pressure, having regard to the temperature of the heating surface to insure that vapor or bubbles do not form at the heating surface in contact with the liquid being heated. Therefore, this invention permits the use of higher operating temperatures, such as temperatures above 170° F. and preferably above 200° F. As the temperature increases, the pressure to be applied as the static pressure component is increased in a controlled manner. By continuous control of the static pressure component on the water to be heated, vapor formation is suppressed and the dissolved mineral salts remain in solution. It will, of course, be appreciated that the pressure within the system will be maintained by air flow from the air inlet port so as to suppress any vapor formation within the body of the saline solution and prohibit the boiling of the solution and the undesirable formation of scale on the heating surface of the heating chamber. Consequently, the air supplied to the pressurizing space is adjusted to adequately meet the pressure requirements of the system, having regard to economies and efficiencies. Additionally, it will be appreciated that this system is readily adaptable to multiple unit arrangements for greater economy of operation.

As will be apparent to persons skilled in the art, various modifications, adaptations and variations of the foregoing specific disclosure can be made without departing from the teachings of the present invention.

I claim:

1. In a method of heating a supply solution containing scale-forming ingredients for subsequent discharge and use wherein the solution being heated is in contact with a solid heating surface and is heated under pressure to suppress vapor bubble formation and encrustation of the heating surface by substantial amounts of scale; the improvement comprising the steps of providing a pressurizing chamber for the solution downstream from said heating surface, said chamber being in unobstructed communication with said surface through said solution, maintaining the volume of solution within the pressurizing chamber at a level less than the total volume of the pressurizing chamber to provide a pressurizing space within said chamber above said solution and delivering to said space a quantity of air to pressurize said space and impart to said solution a back pressure for suppressing vapor bubble formation at the heating surface.

2. The method of claim 1 wherein the heating surface is located within a separate chamber remote from the pressurizing chamber.

3. The method of claim 1 wherein the solution is water having a high mineral salt content.

4. The method of claim 1 wherein the solution flows through the pressurizing chamber after being heated adjacent the heating surface.

5. The method of claim 1 wherein the solution is a saline solution.

* * * * *